United States Patent
Zhai et al.

(10) Patent No.: US 9,627,901 B2
(45) Date of Patent: Apr. 18, 2017

(54) CHARGING CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Kai-Le Zhai, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 141 days.

(21) Appl. No.: 14/721,586

(22) Filed: May 26, 2015

(65) Prior Publication Data

US 2016/0294202 A1    Oct. 6, 2016

(30) Foreign Application Priority Data

Mar. 31, 2015 (CN) .......................... 2015 1 0147112

(51) Int. Cl.
*H02J 7/00* (2006.01)
*G06F 1/00* (2006.01)

(52) U.S. Cl.
CPC .......... *H02J 7/0045* (2013.01); *H02J 7/0036* (2013.01); *H02J 7/0052* (2013.01)

(58) Field of Classification Search
CPC ...... H02J 7/0045; H02J 7/0036; H02J 7/0052; H02J 7/0072

USPC ................................................... 320/107, 137
See application file for complete search history.

(56) References Cited

U.S. PATENT DOCUMENTS

| | | | | |
|---|---|---|---|---|
| 5,798,985 A * | 8/1998 | Nakajima | ............... | G04G 19/00 320/128 |
| 6,351,179 B1 * | 2/2002 | Ikehashi | ................. | G05F 1/465 323/316 |
| 7,942,810 B2 * | 5/2011 | Uchimura | .......... | A61B 1/00039 600/117 |
| 8,190,932 B2 * | 5/2012 | Rui | ...................... | H02M 3/1584 323/271 |
| 8,473,758 B2 * | 6/2013 | Hoffer | ..................... | G06F 1/266 713/300 |
| 9,448,606 B2 * | 9/2016 | Harel | ....................... | G06F 1/263 |
| 2013/0162222 A1 * | 6/2013 | Ke | ............................ | H02J 7/00 320/162 |
| 2015/0324321 A1 * | 11/2015 | Lin | ......................... | G06F 1/266 710/300 |
| 2016/0314671 A1 * | 10/2016 | Zhai | ................... | G08B 21/0438 |

* cited by examiner

*Primary Examiner* — M'Baye Diao
(74) *Attorney, Agent, or Firm* — Steven M. Reiss

(57) ABSTRACT

A charging circuit includes a power supply chipset, a charging port, and a detecting circuit. The power supply chipset includes an enable pin. A voltage on the enable pin controls the power supply chipset. The charging port includes a detecting pin which detects whether there is an electronic device connected on the charging port. The detecting circuit is connected between the detecting pin and the enable pin. The detecting circuit controls the voltage on the enable pin to cause the power supply chipset to output a charging voltage to the power supply chipset in event an electronic device that requires charging is connected to the charging port.

15 Claims, 2 Drawing Sheets

CHARGING CIRCUIT

CROSS-REFERENCE TO RELATED APPLICATION

This application claims priority to Chinese Patent Application No. 201510147112.4 filed on Mar. 31, 2015, the contents of which are incorporated by reference herein.

FIELD

The subject matter herein generally relates to charging circuits, and particularly to a charging circuit to conveniently charge electronic devices.

BACKGROUND

Different portable electronic devices, such as smart phones and tablet computers, are used more and more widely. However, because power stored in a battery of the portable electronic is limited, the portable electronic device can not used for a long time and needs to be charged frequently. Therefore, a charger needs to be carried with the portable electronic devices, which is troublesomely. For handily charging the portable electronic device, the USB port on computer is used to charge the portable electronic device. However, because the USB port is always provided with electric power, it is easy to damage the portable electronic device when the portable electronic device is mis-plugged in the USB port. Thus, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
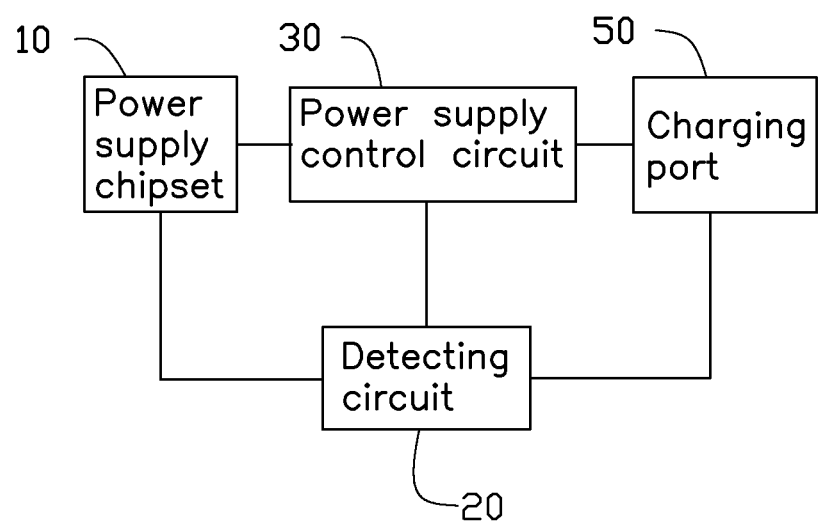
FIG. 1 is a block diagram of one embodiment of a charging circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 illustrates one embodiment of a charging circuit. The charging circuit includes a power supply chipset 10, a detecting circuit 20, a power supply control circuit 30, and a charging port 50. The detecting circuit 20 is connected to the power supply control circuit 30. The charging port 50 is connected to the detecting circuit 20 and the power supply control circuit 30.

Figure 2:
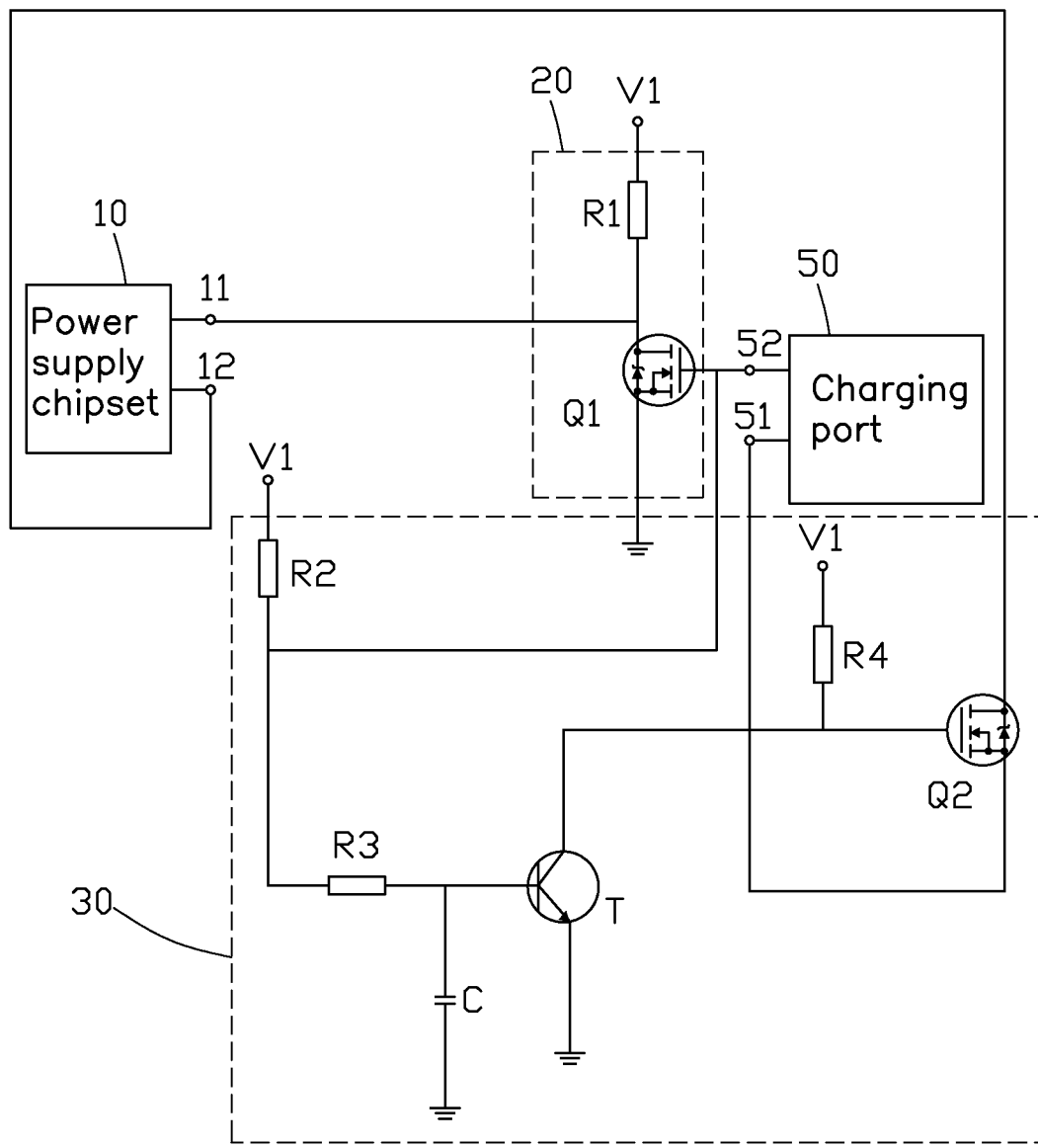
FIG. 2 is a circuit diagram of one embodiment of the charging circuit of FIG. 1.

Referring to FIG. 2, the power supply chipset 10 includes an enable pin 11 and a power supply pin 12. The enable pin 11 is connected to the detecting circuit 20. The power supply pin 12 is connected to the power supply control circuit 30 to supply a charging voltage. The power supply chipset 10 is controlled by the enable pin 11 to work or not. For example, when a voltage on the enable pin 11 is in a low level, the power supply chipset 10 works to control the power supply pin 12 to output the charging voltage. When a voltage on the enable pin 11 is in a high level, the power supply chipset 10 does not work, and the power supply pin 12 does not output the charging voltage.

The charging port 50 includes a charging pin 51 and a detecting pin 52. The charging pin 51 is configured to charge an electronic device (not shown) which is connected to the charging port 50. The detecting pin 52 is configured to detect whether there is an electronic device connected on the charging port 50. When there is an electronic device connected on the charging port 50, the detecting pin 52 outputs a low level voltage detecting signal.

The detecting circuit 20 includes a first transistor Q1. In one embodiment, the first transistor Q1 is a P channel field effect tube. A gate of the first transistor Q1 is connected to the detecting pin 52 of the charging port 50. A source of the first transistor Q1 is connected to ground. A drain of the first transistor Q1 is connected to a working voltage V1 via a first resistor R1. The drain of the first transistor Q1 is further connected to the enable pin 11 of the power supply chipset 10. When there is an electronic device connected on the charging port 50 needed to be charged, the detecting pin 52 is connected to ground to output the low level detecting signal to turn on the first transistor Q1. Thus, the enable pin 11 of the power supply chipset 10 is connected to ground via the first transistor Q1. The power supply chipset 10 works to control the power supply pin 12 to output the charging voltage.

The power supply control circuit 30 includes a second resistor R2, a third resistor R3, a fourth resistor R4, a triode T, a second transistor Q2, and a capacitor C. In one embodiment, the triode T is a NPN type triode, and the second transistor Q2 is a N channel field effect tube. A base of the triode T is connected to the detecting pin 52 via the third resistor R3. The working voltage V1 is connected to the base of the triode T via the second resistor R2 and the third resistor R3. The capacitor C is connected between the base of the triode T and ground. An emitter of the triode T is connected to ground. A collector of the triode T is connected to a gate of the second transistor Q2. The working voltage V1 is supplied to the gate of the second transistor Q2 via the fourth resistor R4. A drain of the second transistor Q2 is connected to the power supply pin 12. A source of the second transistor Q2 is connected to the charging pin 51 of the charging port 50.

In use, when there is an electronic device connected on the charging port 50, the detecting pin 52 is connected to ground to output the low level detecting signal to turn on the first transistor Q1. The enable pin 11 of the power supply chipset 10 is connected to ground via the first transistor Q1. The power supply chipset 10 works to control the power supply pin 12 to output the charging voltage. Simultaneously, the base of the triode T receives the low level detecting signal to turn off the triode T. The base of the second transistor Q2 receives a high level voltage from the working voltage V1 to turn on the second transistor Q2. The power supply pin 12 supplies the charging voltage to the charging pin 51 of the charging port 50 via the second transistor Q2 to charge the electronic device.

When there is not an electronic device connected on the charging port 50, the detecting pin 52 is not connected to ground. The first transistor Q1 is turned off. The enable pin 11 of the power supply chipset 10 receives a high level voltage to control the power supply chipset not to work. Therefore, the power supply pin 12 does not output the charging voltage. The charging pin 51 of the charging port 50 is neutral to protect the charging port 50 from being damaged.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to, and including, the full extent established by the broad general meaning of the terms used in the claims. It will therefore be appreciated that the embodiments described above may be modified within the scope of the claims.

What is claimed is:

1. A charging circuit comprising:
   a power supply chipset comprising an enable pin, a voltage on the enable pin configured to control the power supply chipset;
   a charging port comprising a detecting pin, the detecting pin configured to detect whether there is an electronic device connected to the charging port;
   a detecting circuit connecting the detecting pin and the enable pin;
   wherein the detecting circuit is configured to control the voltage on the enable pin to cause the power supply chipset to output a charging voltage to the power supply chipset in event an electronic device that requires charging is connected to the charging port.

2. The charging circuit of claim 1, wherein the power supply chipset works to output the charging voltage when the voltage on the enable pin is in a high level.

3. The charging circuit of claim 2, wherein the detecting circuit comprises a first transistor, a gate of the first transistor is connected to the detecting pin of the charging port, a source of the first transistor is connected to ground, a drain of the first transistor receives a working voltage via a first resistor, and the drain of the first transistor is connected to the enable pin.

4. The charging circuit of claim 3, wherein the first transistor is a P channel field effect tube.

5. The charging circuit of claim 1, wherein the power supply chipset comprises a power supply pin, the charging port comprises a charging pin, and the power supply pin outputs the charging voltage to the charging pin.

6. The charging circuit of claim 5, wherein a power supply control circuit is connected between the power supply pin and the charging pin.

7. The charging circuit of claim 6, wherein the power supply control circuit comprises a triode and a second transistor, a base of the triode is connected to the detecting pin, a working voltage is supplied to the base of the triode, an emitter of the triode is connected to ground, a collector of the triode is connected to a gate of the second transistor, the working voltage is supplied to the gate of the second transistor, a drain of the second transistor is connected to the power supply pin, and a source of the second transistor is connected to the charging pin.

8. The charging circuit of claim 7, wherein the triode is a NPN type triode, and the second transistor is a N channel field effect tube.

9. A charging circuit, comprising:
   a power supply chipset comprising a power supply pin, the power supply pin configured to output a charging voltage;
   a charging port comprising a charging pin, the charging pin configured to charge an electronic device which is connected to the charging port;
   a power supply control circuit is connected between the power supply pin and the charging pin;
   wherein the power supply control circuit is configured to control the power supply pin to be connected to the charging pin.

10. The charging circuit of claim 9, wherein the power supply control circuit comprises a triode and a second transistor, a base of the triode is connected to the detecting pin, a working voltage is supplied to the base of the triode, an emitter of the triode is connected to ground, a collector of the triode is connected to a gate of the second transistor, the working voltage is supplied to the gate of the second transistor, a drain of the second transistor is connected to the power supply pin, and a source of the second transistor is connected to the charging pin.

11. The charging circuit of claim 10, wherein the triode is a NPN type triode, and the second transistor is a N channel field effect tube.

12. The charging circuit of claim 9, wherein the power supply chipset comprises an enable pin, a voltage on the enable pin is configured to control the power supply chipset to work or not, the charging port comprises a detecting pin, the detecting pin is configured to detect whether there is an electronic device connected on the charging port, a detecting circuit is connected between the detecting pin and the enable pin, the detecting circuit is configured to control the voltage on the enable pin to cause the power supply chipset to output a charging voltage to the power supply chipset in event an electronic device that requires charging is connected to the charging port.

13. The charging circuit of claim 12, wherein the power supply chipset works to output the charging voltage when the voltage on the enable pin is in a high level.

14. The charging circuit of claim 13, wherein the detecting circuit comprises a first transistor, a gate of the first transistor is connected to the detecting pin of the charging port, a source of the first transistor is connected to ground, a drain of the first transistor receives a working voltage via a first resistor, and the drain of the first transistor is connected to the enable pin.

15. The charging circuit of claim 14, wherein the first transistor is a P channel field effect tube.

* * * * *